April 29, 1941.  W. A. HEINZE ET AL  2,240,332
MOLDED FLUID SEAL WITH INTEGRAL HOUSING
Filed Jan. 28, 1939
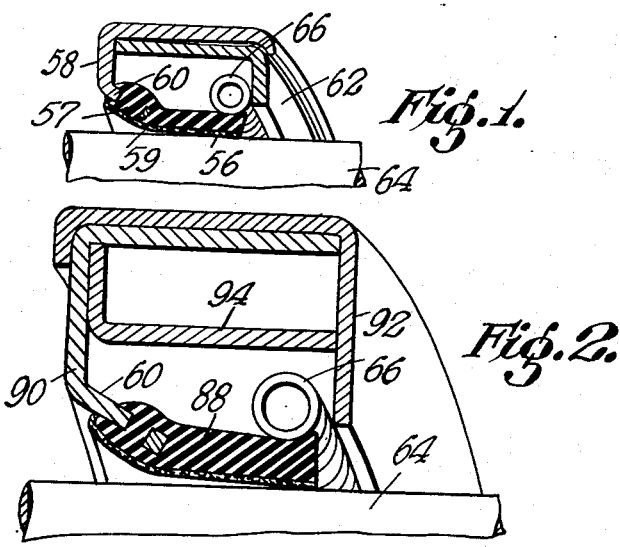
WILLIAM A. HEINZE
WILBURN F. BERNSTEIN
INVENTOR
PER
ATTORNEY Patented Apr. 29, 1941

2,240,332

UNITED STATES PATENT OFFICE 2,240,332

MOLDED FLUID SEAL WITH INTEGRAL HOUSING

William A. Heinze, Chicago, and Wilburn F. Bernstein, Brookfield, Ill., assignors to Victor Manufacturing & Gasket Company, Chicago, Ill., a corporation of Illinois Application January 28, 1939, Serial No. 253,324

1 Claim. (Cl. 288—3)

This invention relates to an improved molded fluid seal with integral housing and has, for one of its principal objects, the provision of a seal or the like which shall be particularly adapted for use in the automotive industry; that is, as applied to the sealing or retaining of oils, grease or other fluids in housings through which rotative shafts project.

One of the important objects of this invention is the provision of a molded fluid seal which has a flexible packing element or diaphragm made of some molded material such as synthetic rubber or the like and which, on account of its nature, can be built into a metal support during the process of molding or vulcanizing, the metal support, in turn, forming a shell or retainer which can be press-fitted or otherwise mounted in the housing whereby the entire device as a single unit will operate to seal or retain fluids in the housing.

Another and further important object of the invention is the provision of a fluid seal with an integral housing, which housing may or may not be used with an additional reinforcing element whereby a stronger structure and an even better sealing effect results.

Another object is the provision in a fluid seal of the class described of a novel means for retaining the combined seal and metal support in a surrounding housing or containing shell.

A still further object of the invention is the provision, in a fluid seal, with an integral housing or metal support, of means for additionally sealing the related elements of the housing or support against leakage of oil therebetween as distinguished from leakage of oil or other fluids past the sealing element itself and between it and its associated rotating shaft.

Other and further important objects of the invention will be apparent from the disclosures in the accompanying drawing and following specification.

The invention, in a preferred form, is shown in the drawing and hereinafter more fully described.

In the drawing:

Figure 1 is a sectional view of an improved molded fluid seal with integral housing constructed in accordance with the principles of this invention.

Figure 2 is a sectional view showing an embodiment somewhat similar to that of Figure 1 but of additional size and with a further reinforcing element incorporated into the housing.

As shown in the drawing:

The reference numeral 56 indicates generally the diaphragm or packing element of this invention which is preferably composed of some flexible molded material as synthetic rubber or the like, the same being vulcanized onto a metal channel or shell section 58 while in the process of construction. It will be noted that the side wall of the metal shell section 58 has an inwardly projecting flange 60 disposed at an acute angle with respect to the axis of the shell and provided with openings 57 therein through which portions of the flexible material flow during the molding and vulcanizing operation, thereby forming a permanent attachment between the metal and synthetic rubber or other material. A facing element of impregnated fabric or the like 59 is preferably, although not necessarily, incorporated into the structure of the sealing element or diaphragm also during the process of molding or vulcanizing.

In actual operation, and according to one preferred embodiment of the invention, the metal element 58 is, after the vulcanization is complete, formed into a cup-shaped channel or shell section as illustrated and combined or assembled with an internal reinforcing shell or channel section 62 also of metal which is fitted thereinto and maintained in desired position by means of an overturned or spun-down rim or lip. It will be obvious that this provides a suitable and satisfactory sealing element composed of a minimum number of parts and which, on account of the good sealing contact between the flexible diaphragm portion 56 and the corresponding shaft 64 on the one hand and the pressed fit of the metal channel-shaped shell composed of sections 58 and 62 into a surrounding housing on the other hand, will afford a fluid-tight sealing structure which will be adequately suitable for practically all conditions, varying, of course, with size and the like. Tensioning means such as a garter spring 66 seats against and maintains the free end or edge of the sealing element 56 in wiping and sealing contact with the shaft 64.

In Figure 2, a structure somewhat similar to that of Figure 1 is illustrated, this including the diaphragm 88 molded in angular fashion to a metallic support or channel section 90, the same being shaped as shown and inclosed in an outer housing or channel section 92, and in this event, an internal reinforcing element in the form of a flanged ring 94 can be provided if desired.

One of the main advantages of structures of this type is that the molded diaphragms can be built into a metal structure during the process of manufacture, and this may be on a production scale, as a great number of sealing elements or diaphragms to fit one size of shaft may be made at one time with sufficient metal therein so as to form retaining housings or shells of a considerable variety of sizes. Then again, these housings or shells may be built up with additional structures to meet varied and various requirements.

We are aware that many changes may be made and numerous details of construction varied throughout a wide range without departing from the principles of this invention, and we, therefore, do not purpose limiting the patent granted hereon otherwise than as necessitated by the prior art.

We claim as our invention:

A fluid seal for sealing a pair of members such as a rotatable shaft and its surrounding housing against the escape or passage of lubricants, grease or other fluids, comprising an annular retaining shell of channel-shape adapted to be mounted upon one of said members and having spaced, substantially parallel side walls, one of said side walls having an inwardly projecting flange disposed at an acute angle with respect to the axis of the shell, a sealing element molded to the inwardly projecting flange and extending therefrom generally axially for sealing engagement with the other of said members, and a spring seating against and maintaining the free end of the sealing element in sealing contact with said other member.

WILLIAM A. HEINZE.
WILBURN F. BERNSTEIN.